United States Patent [19]

Hoag et al.

[11] B  3,982,200

[45] Sept. 21, 1976

[54] ELECTRON BEAM GAS DISCHARGE LASER PRESSURE CONTROL

[75] Inventors: Ethan D. Hoag, Boston; Henry E. Pease, Malden, both of Mass.

[73] Assignee: Avco Everett Research Laboratory, Inc., Everett, Mass.

[22] Filed: Sept. 4, 1973

[21] Appl. No.: 394,350

[44] Published under the second Trial Voluntary Protest Program on January 13, 1976 as document No. B 394,350.

[52] U.S. Cl. .......................... 331/94.5 P; 331/94.5 R
[51] Int. Cl. ............................................... H01s 3/22
[58] Field of Search ................... 331/94.5; 330/4.3; 250/289; 313/74

[56] References Cited
UNITED STATES PATENTS 3,789,321  1/1974  Krawetz .............................. 331/94.5

*Primary Examiner*—Ronald L. Wibert
*Assistant Examiner*—R. J. Webster
*Attorney, Agent, or Firm*—Charles M. Hogan; Melvin E. Frederick

[57] ABSTRACT

A two chamber electrically pumped electron beam stabilized gas discharge laser is enabled to operate at lower electron accelerating voltages for given power applications through provision of very thin separating diaphragms. The apparatus is controlled throughout initial pump down, laser gas filling, laser operation and air release phases to prevent occurrence of a diaphragm rupturing pressure differential between the two chambers or the inadvertent malsequencing of chamber evacuation and backfill.

9 Claims, 1 Drawing Figure

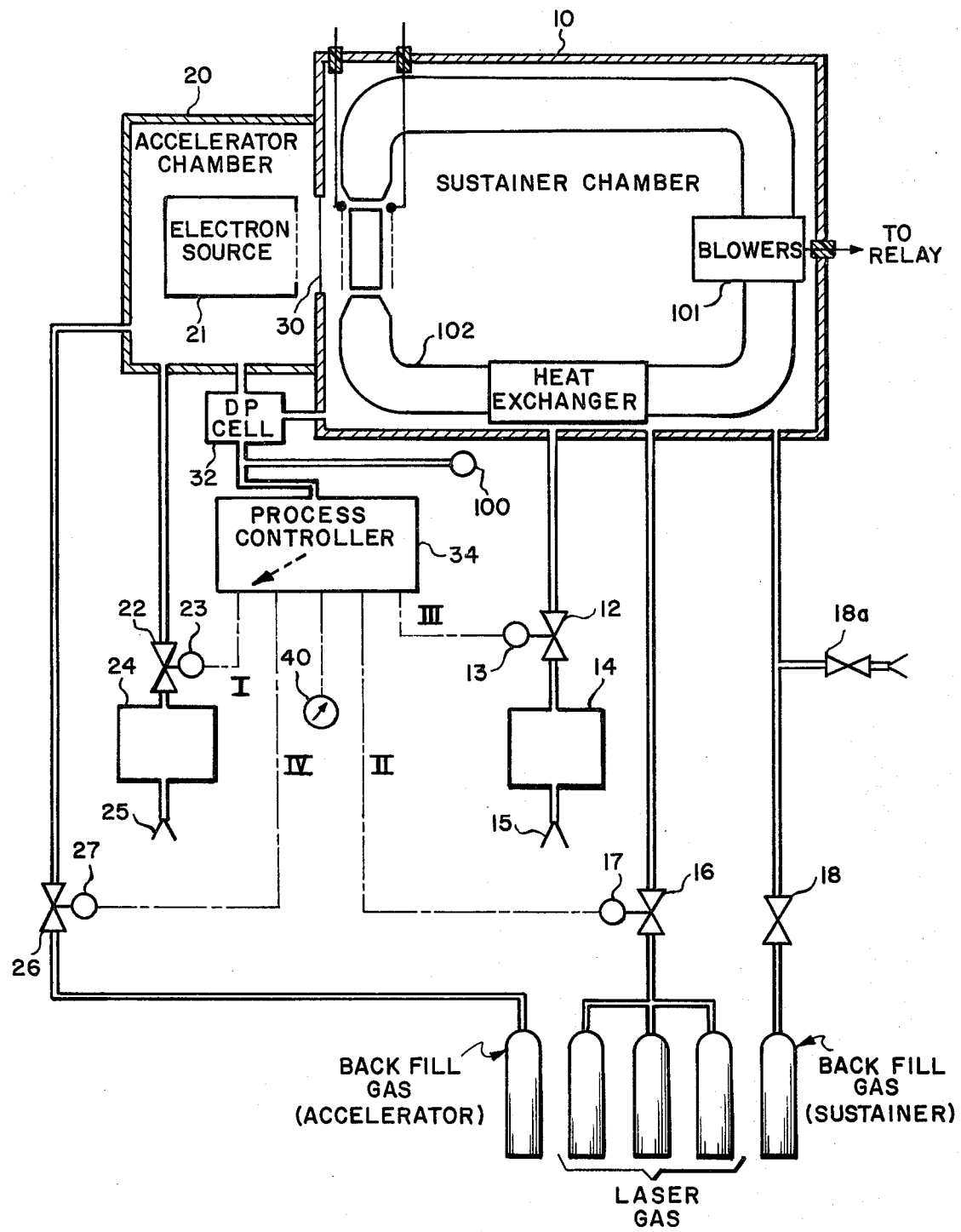

ELECTRON BEAM GAS DISCHARGE LASER PRESSURE CONTROL

BACKGROUND OF THE INVENTION

The present invention relates to high power lasers of the type described in U.S. Pat. No. 3,702,973 granted Nov. 14, 1972 wherein the apparatus comprises a gas laser and an electron source for initiating and maintaining the lasing condition.

In an electron beam stabilized gas laser, there are two contiguous chambers, one in and/or through which the laser medium flows depending on the type of laser construction—the main or sustainer cahmber—and the other in which the electron beam is generated—the accelerator chamber. These two chambers are separated by an electron transparent, gas impervious diaphragm usually a pinhole free, aluminum foil of 0.1 to 0.5 mils thickness. The accelerator chamber must be pumped down to and maintained at a hard vacuum level—about 10 Torr. On the other hand, the main or sustainer chamber is pumped down to the working pressure of the laser gas, about 1/10 of an atmosphere (50 to 100 Torr). In steady-state operation, there is, therefore, an expected pressure difference of about 1/10 atmosphere across the diaphragm. The diaphragm is designed to withstand this expected pressure differential, but is not designed to withstand a substantially greater pressure differential. This design limitation is imposed to avoid greater thickness than necessary since, for a given voltage, fewer electrons would pass through a thicker foil or other diaphragm into the chamber resulting in a lowering of the upper limit on the power in the laser beam. Alternately, to cause the same number of electrons to pass through a thicker foil diaphragm, a higher voltage would have to be applied. This would, in turn, cause harder X-rays to be generated. If the foil ruptures, it has to be changed; this involves air release and the loss of several hours required to replace a diaphragm. In many operations, continuous maintenance of such laser equipment under vacuum is desired. The foil is also simultaneously subject to other failure-inducing mechanisms, i.e. vibrations and thermal stress, as described in said U.S. patent and in co-pending patent application Ser. No. 303,241 filed Nov. 2, 1972, now Patent No. 3,808,551 of common assignment with this application and which disclosure is incorporated herein by reference as though set out at length herein.

It is an important object of the invention to enable provision of very thin foils or other diaphragm means for separation of the two chambers.

It is a further object of the invention to reduce the necessary accelerating voltage for a laser apparatus of the class described consistent with the preceding object.

It is a further object of the invention to reduce incidental X-ray generation in gas laser apparatus of the class described consistent with one or both of the preceding objects.

It is a further object of the invention to maintain rapid pumpdown and backfilling cycles consistent with one or more of the preceding objects.

It is a further object of the invention to extend diaphragm life in gas laser apparatus of the class described consistent with one or more of the preceding objects.

It is a further object of the invention to reduce the incidence of diaphragm repair or replacement, and consequent laser shutdown, consistent with one or more of the preceding objects.

It is a further object of the invention to avoid inadvertent production of reverse pressure differentials across the foil or other faulty sequencing of evacuation and backfill schedules consistent with one or more of the preceding objects.

It is a further object of the invention to utilize minimal control apparatus consistent with one or more of the preceding objects.

It is a further object of the invention to reduce the number of measuring instruments involved to reduce expense and cross-calibration dependence, consistent with one or more of the preceding objects.

It is a further object of the invention to provide a multiple monitoring and control functions in a single instrument consistent with one or more of the preceding objects.

SUMMARY OF THE INVENTION

As part of the preparation for operation of the laser, both the accelerator chamber and the main or sustainer chamber are pumped down by separate pumps or pumping systems. The difference in size of the chambers in outgassing sources therein and temperatures thereof and the difference in the rates at which their respective pumps operate cause the chambers to be evacuated at different rates and those rates change at different pressure levels. During laser operation, the sustainer chamber pressure may be maintained in a dynamic equilibrium by simultaneously admitting lasing gas thereto and withdrawing such gas. After operation of the laser, both chambers may be air released, i.e. backfilled with air or inert gas. In all of these operations, there are dangers of establishing transient pressure differentials across the separating diaphragm in excess of rated bursting pressure if the diaphragm is constructed to eliminate pressure differential rating safety factor, in whole or in part, in favor of avoidance of the above problems of excess voltage and X-ray generation associated with thicker diaphragms.

According to the present invention a differential pressure cell provides a continuous signal proportional to the difference between these pressures in the two chambers. The signal can be either electrical in form or pneumatic, as initially generated in a pressure differential responsive transducer.

The output signal of the differential pressure cell may be supplied to process controller means having a set point effective to prevent a pressure differential between the chambers or from exceeding a preset value. Upon creation of a pressure differential in excess of the desired or preset value, the process controller causes actuation of valves in the pumping systems (including backfill gas control) of each of the chambers to control these pumping systems. Such control may include modulation of flow valves or modulation of pumping speeds as by turning pumps on or off or adjusting their speed or gas flow resulting from their operation.

Initially, at start-up, the pressure in the two chambers is equal; so the pressure difference across the diaphragm is zero. Both sets of pumping stations are started and they both pump with their respective valves wide open. Because of the nature and sizing of the pumps and the sizing of the chambers and conductance thereof, the accelerator chamber is pumped out more rapidly than the sustainer chamber. Pressure drops more rapidly in the accelerator chamber than in the sustainer chamber, until the pressure difference therebetween reaches a set point where the process controller provides a control signal effective to slow down the pumping rate and modulate it in such a way that the pressure difference across the diaphragm is kept substantially constant. As pumpdown continues, the pumping rates change because the pump speed changes at lower pressures in the pressure ranges invloved herein.

When the absolute pressure in the sustainer chamber drops below the set point of, for example, the operating pressure of the sustainer chamber of approximately 70 torr, the controlled valve may be modulated to full open and both chambers pumped at the maximum rate possible dictated only by the pump ratings and the line impedances. This is an initial clean-out phase designed to remove any air, water vapor or other foreign vapors from the two chambers.

By the time the sustainer chamber reaches an appropriate clean-out level (i.e. one micron) the accelerator chamber will have reached a pressure of the order of $10^{-5}$ torr. This difference in pressure exists because pumps most suitable for pumping out the accelerator chamber are designed for much faster pumping at low pressures than pumps most suitable for pumping out the sustainer chamber. Since $10^{-5}$ torr is a very much lower pressure than 70 torr, the operating pressure, the accelerator chamber is utilized as a reference chamber for determining the absolute pressure in the sustainer chamber. Thus, the differential pressure across the diaphragm is now, in fact, the absolute pressure in the sustainer chamber.

Having completed this initial clean-out phase, the accelerator chamber is essentially operational and the sustainer chamber is now ready for the second phase, namely, that of filling it with the appropriate laser gas mixture. To accomplish this, valve control is now switched from the accelerator chamber exhaust valve to the gas fill valve. This is done in such a way that if the sustainer absolute pressure (i.e. the differential pressure now across the diaphragm) is below 70 torr, the fill valve controlling the metered flow of laser gas into the sustainer chamber is wide open. When the pressure of the laser gas nears the desired value of 70 torr, the fill valve is caused to begin to close and finally when the pressure reaches 70 torr, the fill valve is completely closed. The signal which is coupled from the process controller to the controlled valve (i.e. the fill valve in this case) is also preferably coupled to a pressure switch which is set to turn on the wind tunnel blowers at a pressure just below the set point. This provides a substantial cost saving in the manufacture of the laser because it eliminates the necessity of an otherwise expensive sensitive pressure switch to achieve this function.

The system is now ready for the third phase, that of actually operating a laser. When a laser is actually operating an electric discharge constantly exists in the lasing region of the laser. This causes certain chemical changes to take place in the laser gas mixture. These foreign species generally degrade the operation of the laser and, consequently, the gas is preferably constantly replenished. This third phase of the control sequence is accomplished in the following way. Upstream of the fill valve there is provided a mixing manifold which meters and mixes all the appropriate gases at a constant rate. In phase three, the fill valve is opened wide and process control is shifted from the fill valve to the sustainer chamber valve located between the sustainer chamber and the sustainer pump such that metered laser gas is introduced at a constant and appropriate rate while the pump-out rate is regulated to maintain the proper pressure in the sustainer chamber by modulating the pump-out valve.

The fourth and final phase is that of air releasing. If the apparatus is shut down for service, it has to be opened up and both chambers have to be flooded back up to atmospheric pressure. To do this process control is transferred to an accelerator chamber valve which introduces helium or some other inert gas into the accelerator chamber. When the air release phase is initiated, a valve is opened which introduces air into the sustainer chamber. As the sustainer chamber pressure increases, the process controller modulates the accelerator chamber fill valve in such a way as to maintain a constant pressure of approximately one tenth atmosphere across the diaphragm as both chambers fill. This is similar to the initial pump-down phase but in reverse.

These and other objects, features and advantages of the invention will be apparent from the following detailed description with reference therein to the accompanying drawing, in which:

BRIEF DESCRIPTION OF THE DRAWING

The drawing is a schematic diagram of a two chamber gas laser with electron beam stabilization apparatus utilizing a preferred embodiment of the method and apparatus of the present invention.

DETAILED DESCRIPTION OF PREFERRED EMBODIMENTS

The sustainer chamber 10 is pumped via a valve 12, having a valve operator 13, through a pumping system 14 to an ultimate atmospheric outlet 15.

The sustainer chamber 10 may comprise a sealable box having removable end pieces or the like and containing the components necessary for a two chamber electrically pumped electron beam stabilized gas discharge laser. For a more complete description of such an arrangement, reference is made to co-pending application Ser. No. 339,514, filed Mar. 9, 1973 of common assignment with this application and which disclosure is incorporated herein by reference as though set out at length herein.

Briefly, the components within the box, which for purposes of this invention, may be considered to be a sustainer chamber, since the entire interior of the box is at the same pressure which is that necessary in the lasing region, include a heat exchanger, blowers or pumps to cause circulation of the lasing gas, electrodes forming part of the electrical pumping circuit, an optical cavity and ducts defining a gas flow system or wind tunnel within the sustainer chamber for providing gas flow through the lasing region at the optical cavity.

The chamber 10 can be filled with lasing gas via a valve 16 having an operator 17. Such lasing gas may include a 3:2:1 ratio of helium; nitrogen; carbon dioxide or any of carbon monoxide water vapor, sulfur dioxide, cyanide, nitrous oxide, hydrogen, argon, combinations thereof or other gases or combinations known per se in this art. At the end of a complete cycle of usage, the sustainer chamber can be air released in whole or in part by an appropriate backfill inert gas via a valve 18 or alternatively simply exposed to air through the valve 18a, the former being preferred since inert gas air release allows quicker resumption of the next cycle and maintains purity of the sustainer chamber after initial establishment thereof by a first pumping cycle.

An accelerator chamber 20 containing an electron source 21 (including electron accelerating elements) is pumped via a valve 22 having an operator 23 through a pumping system 24 to an ultimate outlet 25. For a more complete discussion of a suitable electron source 21 and acceleration chamber, reference is made to U.S. Pat. No. 3,749,967. At the end of a complete cycle of operation, the accelerator chamber 20 can be wholly or partially backfilled with gas from an appropriate source of inert gas via a valve 26 having an operator 27.

The chambers 10 and 20 are gas pressure isolated by a suitably supported thin foil 30, preferably an aluminum foil of 1/10 to ½ mil thickness of pinhole-free quality. The foil allows electrons generated by electron source 21 to enter the sustainer chamber 10.

A differential pressure responsive cell is provided at 32 and, in principle, may comprise a bellows or diaphragm with two chambers on opposite sides thereof connected respectively to chambers 10 and 20 and having a conventional bellows or diaphragm operated rod or electrical or magnetic pickup (not shown) to provide an output signal. However, it is an important aspect of the invention that the cell 32 is selected as a device of a type well-known per se comprising a gas pressure source which is modulated in accordance with the pressure difference between the two input ports of the device. As applied herein, the input pressures would be provided through pressure connections to the chambers 10 and 20. Suitable conventional apparatus usable as cell 32 is the Taylor Pneumatic Differential Pressure Transmitter Model No. 303TD00111, manufactured by Taylor Instrument Company, Rochester, N.Y.

The output of cell 32 is fed to a process controller 34 which may, for example, comprise conventional logic circuitry actuated by the various control switches provided for operation of the laser. Such switches (not shown) may, for example, include system on and off switches, evacuate chamber switch, fill gas switch, blower start and stop switches, window open and close switches, sustainer voltage on and off switches, electron beam on and off switches, back fill switch, etc. Thus, upon actuation of the laser operation switch or switches, the appropriate valve operators are actuated as illustrated in the drawing. The particular means of effecting the desired process control may be of any desired form or configuration including manual operation, logic circuitry, or electrical or pneumatic systems.

The process controller is selectively connected to and operates any of valve operators 13, 17, 23 and 27 in valve closing or valve opening senses.

The process controller 34 switches control among four positions I, II, III and IV. In position I, control is shunted to operator 23, to shut down valve 22 as pressure differential reaches the setpoint of the controller (typically 1/10 atmosphere) and thereby slows accelerator chamber evacuation rate in relation to sustainer chamber evacuation rate. In position II, the signal is shunted to operator 17 to open or close valve 16 to fill the sustainer chamber to the proper pressure for laser operation. The signal from differential cell 32 to process controller 34 is also fed to pressure switch 100. When the pressure achieves a preset value close to the operating value, pressure switch 100 is actuated and this, in turn, operates a relay (not shown) which starts the blowers 101 comprising part of wind tunnel 102 located within sustainer chamber 10. In position III, process control is switched to valve 12 through operator 13. Simultaneously, valve 16 is opened by a separate non-modulating signal so that laser gas is introduced at a constant metered rate into sustainer chamber 10. Now the pressure therein is held constant by the modulation of valve 12. In position IV, process control is transferred to valve 26 through operator 27 and valve 18 or 18A is opened thus introducing air or back fill gas into the sustainer chamber 10. Valve 26 then regulates the flow of back fill gas into the accelerator chamber in such a way as to keep the differential pressure across diaphragm 30 at approximately one tenth atmosphere while the two chambers are filling to atmospheric pressure.

Details of the laser apparatus with sustainer chamber 10 and electron source 21 can be as set forth in said U.S. Pat. No. 3,702,973, per se, or as modified as set forth in said U.S. Pat. No. 3,749,967, or said U.S. patent application Ser. No. 339,514 filed Mar. 9, 1973, all being of common assignment with this application and which disclosures are incorporated herein by reference as though set out at length herein.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

What is claimed is:

1. Method of operating a two chamber gas laser of the type having an accelerator chamber and a sustainer chamber separated from each other by a thin diaphragm comprising:
   continuously sampling pressures from each of said chambers during simultaneous pumpdown thereof and generating continuously a pressure differential signal and applying said signal to modulate the rate of accelerator chamber pumpdown during initial pumpdown of said two chambers,
   continuing said continuous generation of a pressure differential signal and applying said signal to modulate the rate of backfill of the sustainer chamber,
   then during laser operation continuing said continuous generation of a pressure differential signal and modulating sustainer chamber pressure thereby,
   and maintaining the pressure differential across said diaphragm within 2/10 of an atmosphere throughout said operations.

2. Operating method in accordance with claim 1 and further comprising:
   continuing to generate said differential pressure signal and modulating accelerator chamber backfill while air release backfilling both of said accelerator and sustainer chambers in the course of air release of the apparatus and maintaining such pressure differential within 2/10 of an atmosphere throughout said air release operation.

3. Operating method in accordance with claim 1 wherein
   said pressure differential signal is generated in the form of a pneumatic signal and said modulation is applied through continuously variable valve operators.

4. Operating method in accordance with claim 1 and further comprising:

applying said signal to a readout device after operating pressure is reached with respect to said accelerator chamber pumpdown and reading an indication device measuring the pressure in said sustainer chamber as a usable reading of absolute pressure of said sustainer chamber.

5. Improved method of repeatedly producing controlled high power gas ionizing laser operation with efficient use of ionizing radiation in apparatus comprising acceleration and sustainer vacuum chambers with a gas passage therebetween blocked by a thin diaphragm and a source of ionizing radiation in said acceleration chamber and laser means and sustainer means in said sustainer chamber for sustaining lasing action, the method comprising:

a. evacuating said chambers simultaneously and continuously maintaining a pressure differential therebetween no greater than a preset valve until both of said chambers are at respective minimum pressures, b. then backfilling said sustainer chamber with lasing medium while maintaining said pressure differential at substantially said preset limit, c. then operating said ionizing radiation source and laser means while pumping fresh lasing gas into and used lasing gas out of said sustainer chamber while maintaining said pressure differential between said chambers at substantially said preset limit, d. and wherein a single pressure differential signal is applied to the pressure differential maintenance tasks of (a), (b) and (c).

6. Operating method in accordance with claim 5 and further comprising:

continuing to generate said differential pressure signal and modulating accelerator chamber backfill while air release backfilling both of said accelerator and sustainer chambers in the course of air release of the apparatus and maintaining such pressure differential within 2/10 of an atmosphere throughout said air release operation.

7. Operating method in accordance with claim 5 and further comprising:

applying said signal to a readout device after operating pressure level is reached with respect to said accelerator chambers pumpdown and reading an indication device measuring the pressure in said sustainer chamber as a usable reading of absolute pressure of said sustainer chamber.

8. Improved method of repeatedly producing controlled high power gas ionizing laser operation with efficient use of ionizing radiation in apparatus comprising acceleration and sustainer vacuum chambers with a gas passage therebetween blocked by a thin diaphragm and a source of ionizing radiation in said acceleration chamber and laser means and sustainer means in said sustainer chamber for sustaining lasing action, the method comprising:

a. evacuating said chambers simultaneously and continuously maintaining a pressure differential therebetween no greater than a preset valve until both of said chambers are at respective minimum pressures, b. continuously sampling pressures from said chambers during evacuation thereof and generating continuously a pressure differential signal and applying said signal to modulate the rate of evacuation of said accelerator chamber until said preset pressure differential is reached and the pressure in said sustainer chamber is at about one micron and the pressure in said acceleration chamber is about $10^{-5}$ torr, c. then introducing a lasing medium into said sustainer chamber until said preset pressure differential is reached and applying said signal to modulate the rate of introduction of said lasing medium until said preset pressure differential is reached, and d. operating said ionizing radiation source and laser means and applying said signal to modulate the rate of continuous evacuation of said sustainer chamber while continuously introducing lasing medium at a predetermined rate to maintain said preset pressure differential.

9. Operating method in accordance with claim 8 and further comprising:

continuing to generate said differential pressure signal and modulating accelerator chamber backfill while air release backfilling both of said accelerator and sustainer chambers in the course of air release of the apparatus and maintaining such pressure differential within 2/10 of an atmosphere throughout said air release operation.

* * * * *